United States Patent [19]
Stringer

[11] Patent Number: 5,315,896
[45] Date of Patent: May 31, 1994

[54] QUICK RELEASE BICYCLE PEDAL

[76] Inventor: Michael V. Stringer, 2211 Heron St., Boise, Id. 83702

[21] Appl. No.: 966,875

[22] Filed: Oct. 26, 1992

[51] Int. Cl.⁵ ............................................. G05G 1/14
[52] U.S. Cl. ................................... 74/594.4; 403/377
[58] Field of Search ............... 74/594.1, 594.4, 594.7; 403/321, 325, 376, 377, DIG. 4

[56] References Cited

U.S. PATENT DOCUMENTS

| | | | |
|---|---|---|---|
| 1,050,384 | 1/1913 | Overton | 74/594.4 |
| 2,536,466 | 5/1948 | Rippenbein | 74/594.7 |
| 3,038,567 | 6/1962 | Poddig et al. | 403/377 X |
| 3,303,720 | 2/1967 | Jaulmes | 74/594.7 |
| 3,320,826 | 5/1967 | Morse | 74/594.4 |
| 4,367,663 | 1/1983 | Merics | 403/377 X |
| 4,651,590 | 3/1987 | Thun | 74/594.4 X |
| 4,850,245 | 7/1989 | Femster et al. | 74/594.1 |
| 4,873,890 | 10/1989 | Nagano | 74/594.4 |
| 4,882,945 | 11/1989 | Travizo | 74/594.3 |
| 4,915,374 | 4/1990 | Watkins | 272/73 |
| 5,050,467 | 9/1991 | Brown et al. | 403/325 |

FOREIGN PATENT DOCUMENTS

| | | | |
|---|---|---|---|
| 992465 | 5/1949 | France | 74/594.4 |
| 19173 | of 1898 | United Kingdom | 74/594.4 |
| 12688 | of 1911 | United Kingdom | 74/594.4 |

Primary Examiner—Leslie A. Braun
Assistant Examiner—Ryan W. Massey
Attorney, Agent, or Firm—Michael W. Starkweather

[57] ABSTRACT

A quick release bicycle pedal. The quick release mechanism operates by pressing button 24 which moves locking shaft 20 to allow balls 18 to fit into recesses 22. Thereby, allowing pedal 10 and shaft 12 to be quickly and easily removed from adaptor 16 which is threaded into bike pedal crank shaft 14.

15 Claims, 1 Drawing Sheet

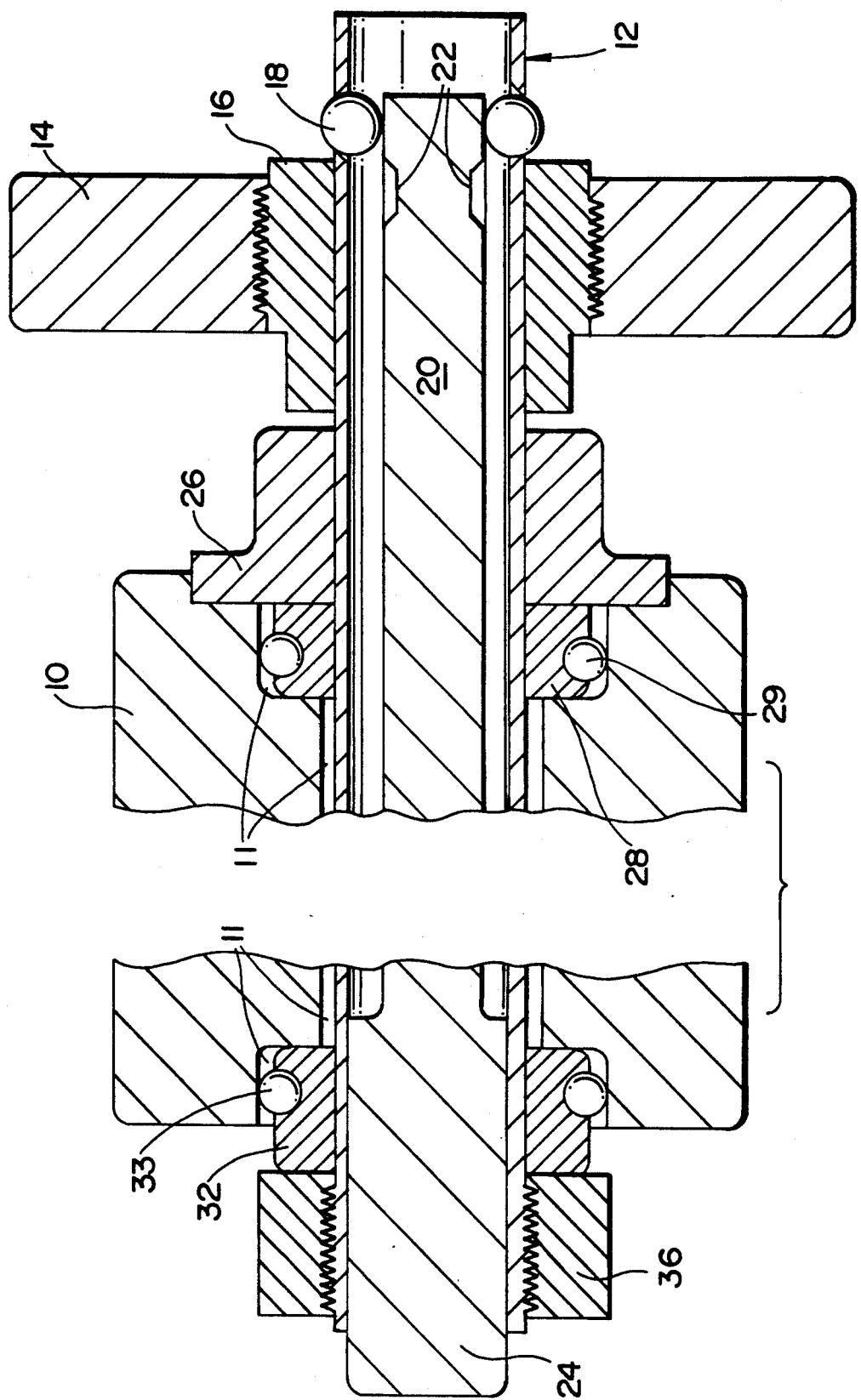

QUICK RELEASE BICYCLE PEDAL

FIELD OF THE INVENTION

The present invention relates to bicycle pedals. Particularly, there is a bicycle pedal which is quickly and easily removed. Uniquely, the pedal is removed via a bayonet-type snap on design.

BACKGROUND OF THE INVENTION

Historically, bicycles have provided a very flexible and inexpensive form of transportation and recreation. In fact, in recent years bike sales have reached into the millions.

With the wide use of the bicycle, people have designed many devices in which to mount the bicycle to cars and trucks so as to transport the bike to various recreation or other locations. Often bike mounting equipment is located at the rear, side, or top of the vehicle.

Similarly, many devices have been designed to easily store the bike while not in use. These devices have provided means for mounting bikes on garage walls, or hang from garage ceilings, or on balconies, to name a few.

Additionally, because of the bikes versatility, bikes are often found being transported through hallways, elevators, and offices.

PROBLEMS

In all the above described uses for the bike, there is one common problem. Bike pedals are always in the way and are relatively difficult to remove. When mounting bikes on vehicles the pedals scratch the vehicles, or hit the person trying to mount the bike. When storing bikes in garages, the pedals always get in the way of storing the bikes closer together. When transporting bikes down hallways the pedals always hit the legs of the person moving the bike. Moreover, pedals require wrenches to be removed; this takes time and is often greasy.

Various arrangements of retractile pedals have been suggested in the past to move the pedal out of the way; however, all of the designs possess serious disadvantages and drawbacks. As an example, the pedals may be deflected about their rotating axis with the result of affording the provision of a single surface only for engagement by the cyclist's foot. Such a limitation in the use of the pedals is found highly inconvenient and undesirable from a practical standpoint. Other known arrangements require the locking or tightening of the pedals upon the folding or swiveling axis, both in the operative or use position, as well as in the inoperative or non-use position of the pedals, whereby to involve special and tiresome conversion operations in changing from one to the other position, and vice versa. Still other known arrangements enable a partial retraction only of the pedals by leaving a portion thereof still to project outwardly at right angles from the crank of the pedal.

It is noted that the above described problems, as well as other problems, are solved through the subject invention and will become more apparent, to one skilled in the art, from the summary and detailed description of the subject invention.

SUMMARY OF THE INVENTION

One skilled in the art will appreciate the advantage of removing the pedals during transportation and storage of the bike. Specifically, the invention provides for an efficient quick release means for removing and reattaching the pedals to a bike. Uniquely, there is a spring loaded button located at one end of the pedal, whereupon pushing of the button will unlock the pedal-to-crank locking mechanism. Additionally, there is an adapter insert threaded into the bike crank adapted for accommodating the pedal-to-crank locking mechanism to the standard crank threads. Moreover, the invention includes a means for attaching to the pedal to the quick release means by a friction reducing design.

Other features and objects of the present invention will become more clear from the following detailed description of the invention, taken in conjunction with the accompanying drawings and claims, or may be learned by the practice of the invention.

BRIEF DESCRIPTION OF THE DRAWINGS

FIG. 1 is a cross sectional view of the quick removable pedal.

It is noted that the drawings of the invention are not to scale. The drawings are merely schematic representations, not intended to portray specific parameters of the invention. The drawings are intended to depict only typical embodiments of the invention, and are therefore not to be considered limiting of its scope. The invention will be described with additional specificity and detail through the use of the accompanying drawing.

DETAILED DESCRIPTION OF THE ILLUSTRATED EMBODIMENT

This disclosure of the invention is submitted in furtherance of the constitutional purposes of the U.S. Patent Laws "to promote the progress of science and useful arts" (Article 1, Section 8 of the U.S. Constitution).

Incorporated Material

The following U.S. patents are herein incorporated by reference for pertinent and supporting information:

U.S. Pat. No. 4,915,374, is a recumbent exercise cycle comprising a pair of pedals and a seat which are each individually adjustable relative to a crankshaft that is rotatably mounted on the frame of the exercise cycle. In combination, each pedal is connected by an extension arm to a point on a crank arm for movement of the pedal along a circular path about the point on the crank arm, and the crank arm is connected to the crankshaft for movement of the point along a circular path about the crankshaft.

U.S. Pat. No. 4,882,945, is a simple improved rotary to linear motion mechanism for increasing the pedal leverage on a bicycle using a telescoping pedal support arm and a rotating crank-disc engaging a coupling connecting a rod to convert the rotary motion of the pedal to linear extension of the pedal support arm.

U.S. Pat. No. 4,850,345, is an extender arm for a bicycle crank arm consists of a generally cylindrical structure suitable for being slidably mounted on the crank arm of the bicycle. The distal end of the extender includes an opening for the mounting of a bicycle pedal. The extender arm contains at least one opening in its side for receipt of a bolt or fastener which will extend through the extender arm and into the opening at the end of the crank arm for receipt of a pedal. In one embodiment, the extender also includes a set screw at the proximal end opposite the distal end on which the pedal is mounted for stabilizing the extender arm on the crank arm.

U.S. Pat. No. 3,303,720, is a folding pedal for bicycles which is substantially free from parts projecting outwardly from the crank of the pedals.

U.S. Pat. No. 2,536,466, is a folding pedal yoke for a bicycle. Wherein the pedal pivotally folds upward to be locked in a position substantially parallel to the crank arm.

For the purpose of providing background material which may in some respects illustrate the state of the art, the following sales literature is herein incorporated by reference: by Bike Nashbar Company, summer 1989 sales catalog, pages 23-26, which illustrates various specialty bike pedals for sale.

General Embodiment

FIG. 1 is a detailed illustration of the invention and includes the following elements: The pedal 10 is hollow having a longitudinal hole 11 therethrough. The pedal is capable of rotating about shaft 12, which extends through hole 11. Shaft 12 is connected to crank or crank arm 14. Adapter 16, threads into crank 14, and slidably receives shaft 12. Shaft 12 has locking balls 18. Locking shaft 20 has indents 22, and button 24. Spacer 26 is unfixedly coupled to shaft 12, and engages adapter 16 so as to keep the pedal spaced away from crank 14. Ball bearing housing 28 is unfixedly coupled to shaft 12 and fixedly coupled to spacer 26, and holds ball bearings 29 so as to provide smooth rotation of the pedal around shaft 12. Ball bearing housing 32 is unfixedly coupled to shaft 12, and holds ball bearings 33 so as to provide smooth rotation of the pedal around shaft 12. Locking nut 36 is threaded on shaft 12 and tightly abuts to housing 32.

Operation of the Invention

Locking nut 36 and locking balls 18 combine to lock the complete assembly of the shaft and pedal to the adapter 16 and crank 14.

To quickly release the pedal from the crank 14, the locking shaft is moved forward, towards the crank, by a person pressing upon button 24. This movement allows locking balls 18 to fit into indents 22, thus allowing the balls to be recessed into shaft 12. When the locking balls are recessed, shaft 12 is capable of being extracted from adapter 16, thereby accomplishing the easy removal of the pedal assembly from the crank.

It is noted that locking shaft 20 has a biasing device (not shown) to bias the shaft into the illustrated position.

It is further noted that shaft 12 may be removed from or inserted into the whole pedal assembly by retracting the locking balls.

A kit can be assembled to adapt any pedal to be quick releasing. The kit would generally include the following parts: shaft 12 and the associated pieces, spacer 26, adapter 16, housings 28 and 32, and locking nut 36.

Remarks about the Invention

It is noted that distal refers to the end of the pedal away from the crank 14 and encompassing button 24. Thereby, proximal refers to the pedal end closest to the crank 14.

It is further noted that the shaft assembly, comprising the shaft 12, locking shaft 20, locking balls 18, indents 22, button end 24, can be purchased from QRP Inc., at Reach Rd. & North Drive, PO Box 3572, Williamsport, PA, found on drawing no. 3-QRP11, entitled Sportschair Pin Assembly.

VARIATIONS IN THE INVENTION

There are several obvious variations to the broad invention and thus come within the scope of the present invention. Uniquely, this invention may work with any variation of locking nut 36, via several nuts and washers or even pin type arrangements. Additionally, any form of bearing housings would work. Similarly, the spacer 26 can generally be most any shape. Moreover, the adapter is not constrained by the shape shown, and may even be adapted to incorporate ball bearings for friction purposes.

While the invention has been taught with specific reference to one embodiment, someone skilled in the art will recognize that changes can be made in form and detail without departing from the spirit and the scope of the invention. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Although subheadings are used throughout the specification, these are merely provided for assisting the reader; wherein, the writer is free to enter any information under any heading/s.

What is claimed and desired to be secured by United States Patent is:

1. A bicycle pedal assembly, comprising:
   a) a bicycle pedal having a hole extending therethrough; and
   b) a removable hollow shaft, extending through said hole, said hollow shaft including:
      b1) at least one locking ball, located at one end of said hollow shaft, embedded into said hollow shaft so as to have a portion of said locking ball project out of said shaft; and
      b2) a locking shaft, extending therethrough said hollow shaft, having:
         i) recesses located at one end; and
         ii) a button located at another end, said button extending out of said hollow shaft.

2. The bicycle pedal as in claim 1, further comprising:
   at least one ball bearing housing, fitting over and around said hollow shaft and being recessed into said pedal.

3. The bicycle pedal as in claim 2, further comprising:
   locking means, attached to said hollow shaft near said button, for locking said hollow shaft to said pedal.

4. The bicycle pedal as in claim 3, further comprising:
   a spacer device, fitting over and around said hollow shaft, being recessed into said pedal, and located near said one end of said locking shaft.

5. The bicycle pedal as in claim 4, further comprising:
   an adapter device, fitting over and around said hollow shaft, being recessed into said pedal, and located near said one end of said locking shaft, having threads on an outside surface.

6. A bicycle pedal assembly, comprising:
   a) a bicycle pedal having a hole extending therethrough;

b) a removable hollow shaft, extending through said hole;

c) at least one locking ball, located at one end of said hollow shaft, embedded into said hollow shaft so as to have a portion of said locking ball project out of said shaft;

d) a locking shaft, extending therethrough said hollow shaft, having:
  d1) recesses located at one end,
  d2) a button located at another end, said button extending out of said hollow shaft;

e) at least one ball bearing housing, fitting over and around said hollow shaft and being recessed into said pedal;

f) locking means, attached to said hollow shaft near said button, for locking said hollow shaft to said pedal;

g) a spacer device, fitting over and around said hollow shaft, being recessed into said pedal, and located near said one end of said locking shaft; and h) an adapter device, fitting over and around said hollow shaft, and located near said one end of said locking shaft, having threads on an outside surface.

7. A bicycle pedal assembly, comprising:

a) a bicycle pedal having 1) a first hole extending longitudinally therethrough, 2) a first end, and 3) a second end;

b) a crank means, having a second hole, for attaching the second end of the bicycle pedal thereto; and c) a removable hollow shaft, extending through said first hole and into said second hole; and having:
  c1) a locking means, located at the second end of said hollow shaft,
  for securing the bicycle pedal to said crank means when said locking means is actuated into a first position, and
  for allowing removal of the bicycle pedal from the crank means when said locking means is actuated into a second position.

8. The bicycle pedal of claim 7, where the removable hollow shaft is protruding through said second hole in said crank means.

9. The bicycle pedal of claim 8, where said locking means is at least one locking ball that is embedded into said hollow shaft to have a minor portion of said locking ball project out of said hollow shaft.

10. The bicycle pedal of claim 9, further comprising:
a locking shaft means, extending therethrough said hollow shaft and contacting the locking ball portion inside of the hollow shaft,
for moving the locking ball into the first and second positions.

11. The bicycle pedal of claim 10, where the locking shaft means further comprises:
  a) recesses contacting the locking ball to actuate the second position;
  b) axially protruding portions, contacting the locking ball to acturate the first position; and
  c) a manual actuation means, located at the first end of peddal and extending out of said hollow shaft.

12. The bicycle pedal of claim 11, further comprising:
at least one ball bearing housing, fitting over and around said hollow shaft and being recessed into said pedal.

13. The bicycle pedal of claim 12, further comprising:
hollow shaft locking means, attached to said hollow shaft near the first peddal end, for locking said hollow shaft to said pedal.

14. The bicycle pedal of claim 13, further comprising:
a spacer device, fitting over and around said hollow shaft, being recessed into said pedal, and located near said crank means.

15. The bicycle pedal of claim 14, further comprising:
adapter means, fitting over and around said hollow shaft, being recessed into said crank means, having threads on an outside surface, for adapting the second hole in the crank means to hold the hollow shaft.

* * * * *